(12) United States Patent
Mittal

(10) Patent No.: US 7,409,205 B2
(45) Date of Patent: Aug. 5, 2008

(54) VIRTUAL RADIO

(75) Inventor: Nitin Mittal, Singapore (SG)

(73) Assignee: Nokia Corporation, Espoo (FI)

( * ) Notice: Subject to any disclaimer, the term of this patent is extended or adjusted under 35 U.S.C. 154(b) by 241 days.

(21) Appl. No.: 10/879,619

(22) Filed: Jun. 29, 2004

(65) Prior Publication Data

US 2006/0009199 A1    Jan. 12, 2006

(51) Int. Cl.
    H04M 3/42    (2006.01)
(52) U.S. Cl. .................. 455/414.1; 455/3.02; 455/130; 174/254; 174/255
(58) Field of Classification Search ................ 455/3.01, 455/575.2, 556, 414.1, 3.02, 130; 725/19, 725/37; 174/254, 255, 256
    See application file for complete search history.

(56) References Cited

U.S. PATENT DOCUMENTS

| 6,154,649 | A | 11/2000 | Reichstein | 455/426 |
| 6,510,325 | B1* | 1/2003 | Mack et al. | 455/575.2 |
| 6,526,275 | B1* | 2/2003 | Calvert | 455/418 |
| 2002/0092019 | A1* | 7/2002 | Marcus | 725/37 |
| 2002/0119760 | A1 | 8/2002 | Oyagi | 455/130 |
| 2002/0194593 | A1 | 12/2002 | Tsuchida et al. | 725/32 |
| 2003/0125075 | A1* | 7/2003 | Klovborg | 455/556 |
| 2003/0129941 | A1* | 7/2003 | Kawamata et al. | 455/3.02 |
| 2005/0045373 | A1* | 3/2005 | Born | 174/254 |
| 2005/0086682 | A1* | 4/2005 | Burges et al. | 725/19 |
| 2005/0153650 | A1* | 7/2005 | Hikomoto | 455/3.01 |

FOREIGN PATENT DOCUMENTS

| EP | 1 026 845 A2 | 8/2000 |
| EP | 1 026 845 A3 | 8/2000 |
| WO | WO 02/082834 A1 | 10/2002 |

OTHER PUBLICATIONS

"Digital Video Broadcasting (DVB); Framing Structure, Channel Coding and Modulation for Digital Terrestrial Television", European Standard (Telecommunications Series), EN 300 744, V1.1.2, (Aug. 1997), 47 pgs.

* cited by examiner

*Primary Examiner*—Joseph Feild
*Assistant Examiner*—Michael Vu
(74) *Attorney, Agent, or Firm*—Harrington & Smith, PC

(57) ABSTRACT

A portable electronic device such as a mobile station 22 has a broadcast radio receiver 60 and an internal storage 50 for storing media files 74, 76, 78, 80. When a received broadcast radio signal exceeds a quality parameter, that signal is sent to a speaker 56. Otherwise, the device 22 enters a virtual radio mode and plays the stored media files in an order that is not determined by the user of the device. The order is determined by an instruction stored in the internal storage 50, and switching to the virtual mode is based on a quality of the received broadcast radio signal. Media files may include entertainment music or video files, traffic and weather, DJ commentary, and advertisements. Various media files may be updated on different frequency intervals so that the content remains current, and to better commercialize the invention. Users may add personal media files and may select a genre or source for certain other media files.

20 Claims, 5 Drawing Sheets

| FIG.3A | | FIG.3B |
|---|---|---|
| NATIONAL NEWS — 76 | | NATIONAL NEWS |
| ADVERTISEMENT 1 — 80 | | ADVERTISEMENT 1 |
| DJ COMMENTARY 1 | ⎫ 74 | DJ COMMENTARY A |
| SONG 1 | ⎭ | SONG A |
| ADVERTISEMENT 2 — 80 | | ADVERTISEMENT 2 |
| WEATHER — 76 | | WEATHER |
| ADVERTISEMENT 3 — 80 | | ADVERTISEMENT 3 |
| DJ COMMENTARY 2 | | DJ COMMENTARY B |
| SONG 2 | ⎬ 74 | SONG B |
| SONG 3 | | SONG C |
| LOCAL NEWS — 76 | | LOCAL NEWS |
| ADVERTISEMENT 1 | | ADVERTISEMENT 1 |
| PERSONAL COMM'TARY 1 — 78 | | PERSONAL COMM'TARY 1 |
| SONG 4 — 74 | | SONG 4 |
| ADVERTISEMENT 3 — 80 | | ADVERTISEMENT 3 |
| DJ COMMENTARY 3 | | DJ COMMENTARY C |
| SONG 5 | ⎬ 74 | SONG E |
| DJ COMMENTARY 4 | | DJ COMMENTARY D |

FIG.3A    FIG.3B

VIRTUAL RADIO

FIELD OF THE INVENTION

The present invention relates to broadcast radio receivers having a memory for storing entertainment media files such as music files. It is particularly relevant to mobile stations having a multimedia memory card for storing such files and a receiver for receiving FM radio signals or other such broadcast radio signals apart from those related to mobile telephony.

BACKGROUND

Consumers in urban areas spend an appreciable amount of time commuting between home, school, place of employment, and various other locations for social engagements. Many choose to listen to broadcast radio, particularly AM and FM radio, both to pass the time with music and commentary from a disc-jockey, and to keep informed as to weather forecasts, news, and the like. Some models of mobile stations (MSs) currently include an FM radio receiver integrated with their mobile telephony circuitry so that users of the MS in generally need not carry multiple devices for mobile telephone service and FM radio reception.

Densely populated urban areas often include tunnels, underground trains (subways), and the like that causes reception on a commuter's broadcast radio receiver to be interrupted or at least severely degraded for appreciable periods of time. Consumers often switch their radio receiver off when the signal quality becomes too degraded to avoid hearing excessive static, and await turning it back on again until after they emerge from the tunnel or subway. When the commuter is driving through a tunnel, this translates into several distractions from driving duties during the critical times of entering and leaving the tunnel. When the commuter is riding a subway, this translates into a potentially large block of idle time that the consumer was neither informed with updates of news and weather, nor entertained with music and disc jockey commentary.

What is needed in the art is a way to get current information to persons while they are in locations that are unavailing to broadcast radio signals such as AM, FM and recently popularized digital (satellite) radio. Digital radio operates in the U.S. at approximately 2.3 GHz, and appears even more susceptible to signal interruption by physical obstacles. Despite using ground-based repeaters to overcome adverse effects of buildings and bridges, digital radio is subject to similar subway and tunnel limitations as noted above.

SUMMARY OF THE INVENTION

This invention is in one aspect a portable electronic device, portable being handheld and preferably a mobile station. The device includes a broadcast radio receiver to receive a broadcast radio signal, which is at least one of an AM, FM and a digital radio signal. The device further has an internal storage to store media files that each has an audio component. The internal storage also stores an instruction as to an order of play for the media files. The device further includes a speaker for converting the received radio signal and the media files to an audible signal that is humanly perceptible, and a switch and a processor. The switch decouples the speaker from the broadcast radio receiver and couples the speaker to the plurality of media files. The processor plays the plurality of media files according to the order of play when the speaker is coupled to the plurality of media files. Preferably, the switch may be actuated manually by a user of the device, or automatically based on a degradation of the signal quality of the received broadcast radio signal. In one embodiment, the switch is automatically actuated based on a quality of the received AM, FM and digital radio signal. In another embodiment that may be combined with that embodiment immediately above, the instruction or order of play is not entered by a user of the device, and may be only partially alterable or not alterable by a user.

In another aspect, the present invention is a portable electronic device that executes a method of playing media files. This method includes storing, on an internal storage media of a portable electronic device, a plurality of media files and an instruction. The instruction directs an order of play for the plurality of media files. Further, the method includes receiving a broadcast radio signal at the electronic device, coupling the broadcast radio signal to a speaker of the portable electronic device, and automatically coupling the plurality of media files to the speaker and playing the plurality of media files in the order of play directed by the instruction. This automatic coupling of the media files to the speaker occurs when a quality of the received broadcast radio signal passes through a threshold quality parameter, such as when the received broadcast radio signal degrades below a threshold signal strength or minimum signal to noise ratio.

In another aspect, the present invention is a method of commercializing a service to provide media files to a portable device. This method includes electronically providing (such as by wirelessly downloading) to a portable device a series of media files, and also an instruction as to a sequential order in which the media files are played on the portable device. Each media file includes an audio component, and at least one of the media files is an advertisement. The method further includes charging a fee to a business entity identified in the advertisement. The fee may be variable based on the position in the order of play the advertisement lies, and a fee may be charged to the user of the device based on providing updated media files.

These and other features, aspects, and advantages of embodiments of the present invention will become apparent with reference to the following description in conjunction with the accompanying drawings. It is to be understood, however, that the drawings are provided solely for the purposes of illustration and not as a definition of the limits of the invention.

BRIEF DESCRIPTION OF THE DRAWINGS

FIG. 3A is a listing of exemplary media files that may be stored in a portable device and played in a stipulated sequential order when a portable device is in a virtual radio mode.

FIG. 3B is similar to FIG. 3A, but showing a second set of media files, some of which may be common with the first list of FIG. 3B, where lists are matched to radio stations tuned during a normal radio mode.

DETAILED DESCRIPTION

Figure 1:
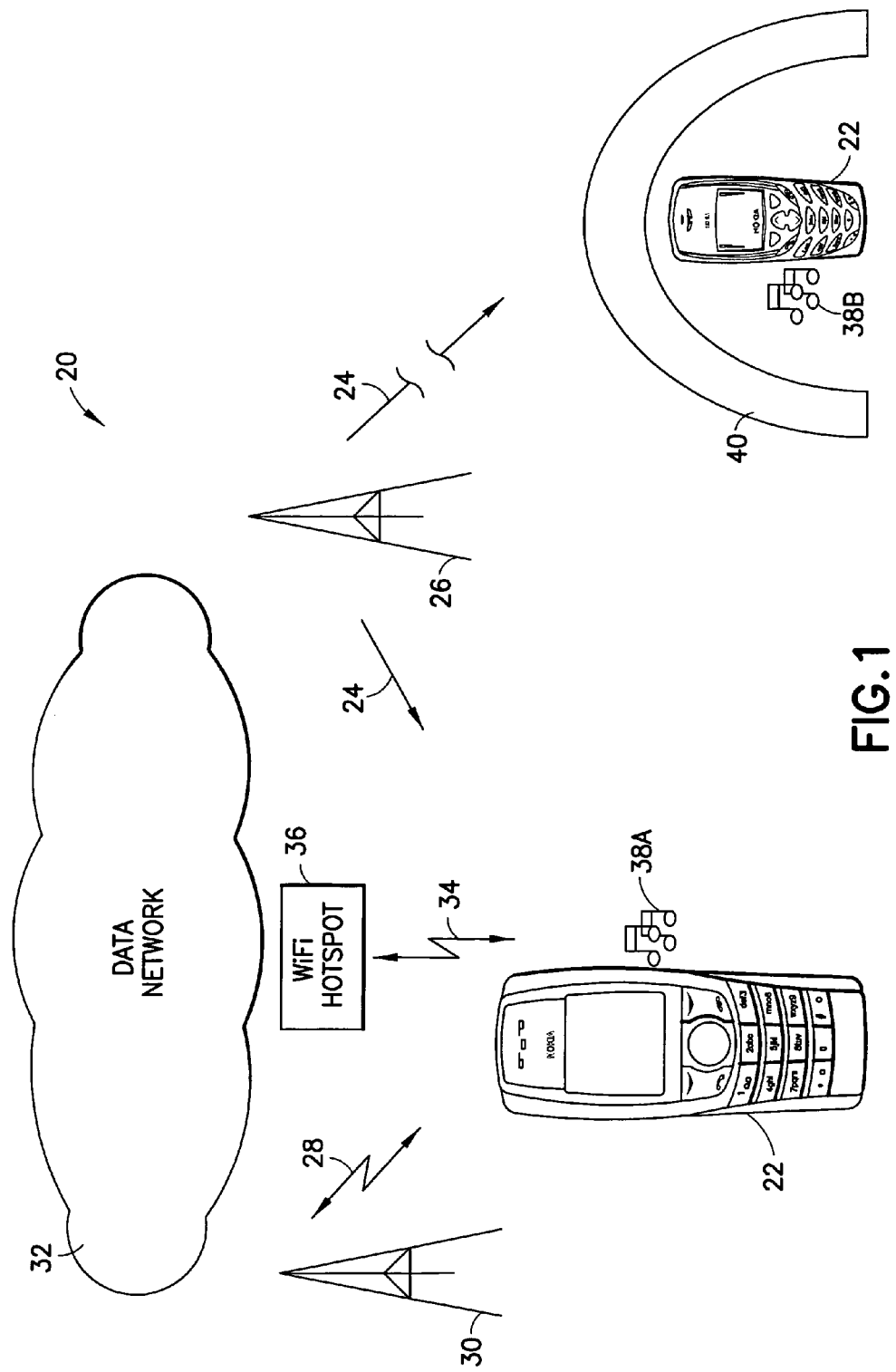
FIG. 1 shows a mobile station adaptable to function as a normal radio and a virtual radio depending upon the viability of receiving wireless broadcast radio signals.

FIG. 1 depicts an environment 20 that details the present invention and its advantages over the prior art. A mobile station (MS) 22 is in a position to receive broadcast radio signals 24 from a broadcast radio tower 26 or repeater. As used herein, broadcast radio signals are those signals transmitted for public reception by more than one receiver over a licensed portion of the radio spectrum. Broadcast radio signals include traditional AM and FM band signals, and also includes digital radio that is transmitted via satellite and possibly repeater towers, and generally offered on a subscriber basis (such as those digital satellite radio services offered by XM Radio® and Sirius Radio®). Broadcast radio signals may be differentiated from other radio signals in that they are unidirectional; the end receiver of a broadcast radio signal has no capability to transmit back to the sender. Repeater towers that relay a broadcast radio signal are not end receivers. As will be detailed below, digital video signals broadcast through a network of local or regional portals, such as DVB-H (digital video broadcast for handheld devices) signals, are also considered broadcast radio signals for the purposes described herein, whether or not those signals are available to the public on a subscriber basis. DVB signals are considered herein digital radio signals.

The MS 22 includes a mobile telephony transceiver to communicate with other parties telephonically through a cellular link 28 and base station 30. The MS 22 may also include a local wireless transceiver to communicate with the internet 32, an intranet, or other data-based network via a local wireless link 34 and a portal 36 such as a WiFi hotspot, a WLAN node that couples a wireless local area network (WLAN) to a broader network 32, a PC with Bluetooth and internet capability, and the like. This local wireless link 34 may be electronic or optical, such as an infrared communication link.

Normally, the MS 22 receives the broadcast radio signal 24 with sufficient signal strength that it converts the radio signal 24 to an audible signal 38A that derives from the radio signal 24 as do other broadcast radio receivers that are well known in the art. However, the MS 22 is portable, and on occasion may be moved within a tunnel or other location where an obstruction 40 blocks or otherwise severely degrades a broadcast radio signal 24. In this instance, the MS 22 according to the present invention acts as a "virtual radio" and plays media files that are stored in an internal memory. For brevity hereinafter, when the MS 22 or other portable electronic device operates as a normal broadcast radio receiver, converting the broadcast radio signals to audio, it is termed as operating in a normal radio mode. When the device media files that are stored within, it is operating in a virtual radio mode.

One aspect of the inventive MS 22 is that it may switch from normal to virtual radio mode automatically. While the inventive MS 22 may allow for a user to manually switch from normal to virtual radio mode, it preferably also switches automatically when the quality of the broadcast radio signal that is received at the MS 22 degrades below a specified threshold. That threshold may be a signal to noise ratio (SNR), a signal power level, a total harmonic distortion, a percent degradation in signal power level or SNR within a proscribed time period, a SNR or signal power level threshold that is not met for a proscribed time period, and the like. For example, FM radio chipset model TEA5767HN from Philips Electronics® is viable for use in a MS 22, and specifies a radiofrequency input level of 2 $\mu V$ and THD around 1.5%. An appropriate threshold for that particular chipset may be RF signal power less than about 2 $\mu V$ at the device 22. Many other appropriate thresholds are possible. Respecting the automatic switching, the virtual radio mode is entered only from the normal radio mode, and the virtual radio does not turn on when the user was not listening to the normal radio mode immediately preceding the signal degrading below the threshold.

Another aspect of the present invention is that the MS 22 has a plurality of stored media files, and the order in which the MS 22 plays the stored media files while in the virtual radio mode is not determined by the user of the MS 22 but is according to a computer instruction that is loaded onto the MS 22. That download preferably occurs during manufacture of the device 22 prior to it's initial entry into the retail stream of commerce, and may be changed or replaced (or even initially loaded) via a download from a cellular 28 or local wireless link 34 where the media files themselves may be changed or replaced, as detailed below. Playing various media files in an order not established by the user may better mimic a true broadcast radio experience, in that the user has no advance knowledge of the next song or commentary or advertisement. That is not to say the user has no input, but merely that the user cannot direct the entire order of play. The order of play may allow the user to select media files for a first, second, and fourth slot in a sequence, and not to select the third and fifth slot, for example. Alternatively, the user may not be enabled to alter or direct the order of any media files.

In a preferred embodiment, the device 22 changes back from the virtual radio mode to the normal radio mode when the broadcast radio signal at the device exceeds a threshold. The threshold switching from normal to virtual may or may not be the same as that switching from virtual to normal. In the example of a user taking a subway, the device 22 might operate in the normal radio mode when the user is enroute to an embarking subway station where the broadcast radio signal at the device exceeds the threshold, however defined. The device 22 changes automatically to virtual radio mode as the user carries the device into an entrance stairwell of the embarking subway station, where the broadcast radio signal is degraded sufficiently and fails to meet the threshold. Eventually, the user carries the device 22 up an exit stairwell of a disembarking subway station. The broadcast radio signal again exceeds the threshold and the device 22 returns automatically to the normal radio mode.

Figure 2:
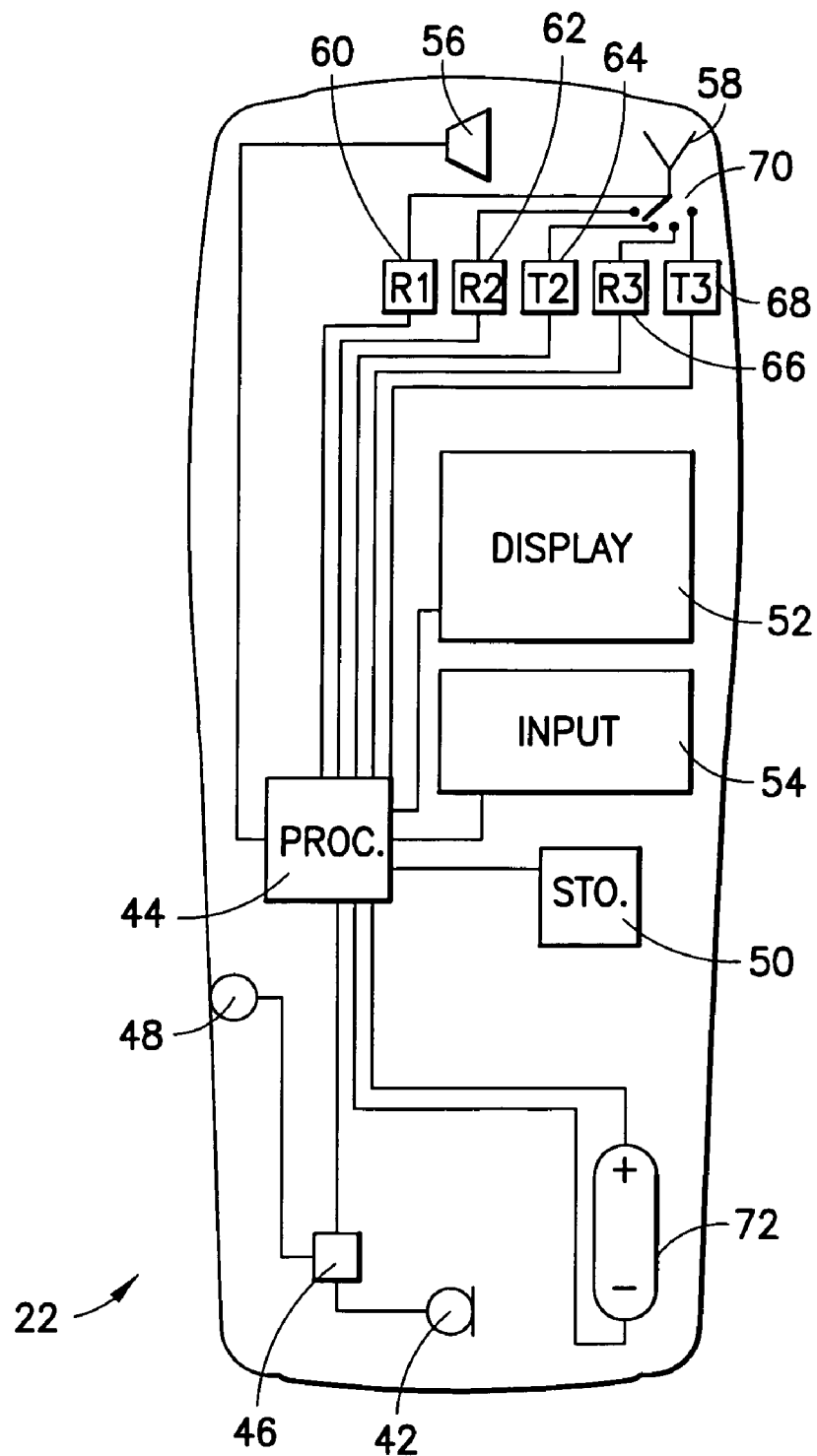
FIG. 2 is a block diagram of a mobile station according to a preferred embodiment of the present invention.

FIG. 2 is a schematic block diagram of a mobile station 22 according to a preferred embodiment of the present invention, though the present invention need not be embodied in a portable device that has mobile telephony capability. The MS 22 includes a microphone 42 coupled to a processor 44 through a buffer memory 46, and may also include a digital camera 48 so coupled. An internal storage medium 50 may be magnetic, electronic, optical, or the like, and stores files, computer instructions, signal constellations and algorithms, and the like. The internal storage medium 50 may be one or several separate components, and may include both ROM and read-write RAM memory. A display interface 52 and an input block 54 may be combined, at least partially, as a touch-sensitive display screen as is known in the art. The display interface provides text and graphic information to a user, and the input block 54 may include buttons, soft keys with changeable functions, and dedicated keys such as power on and off. An output of the processor leads to a speaker 56 or other digital to analog transducer. One or more antennas 58 are coupled to the processor through a broadcast radio receiver (R1) 60. The antenna 58 is also selectively coupled, through a 4-way switch 70 as shown, to a local data receiver (R2) 62, a local data transmitter (T2) 64, a mobile telephony receiver (R3) 66, and a mobile telephony transmitter (T3) 68. The switch 70 may be disposed on the same substrate as the processor 44. The entire apparatus 22 is powered by a portable power source 72 such as a traditional galvanic battery.

In the normal radio mode, the broadcast radio receiver (R1) 60 receives a broadcast radio signal. The processor compares a measured signal quality to a reference threshold. In the normal radio mode, the measured signal quality exceeds the threshold, the processor couples the broadcast radio receiver (R1) 60 to the speaker 56, which converts it to an audible signal in a humanly discernible form (about 20-20,000 Hz). It is noted that, depending upon the signal quality chosen to be measured, the normal radio mode may be appropriate when the broadcast signal quality does not exceed the quality threshold. For example, if the quality threshold is a value for THD, then not exceeding the THD threshold results in the normal radio mode and distortion above the THD threshold results in the virtual radio mode. To encompass either eventuality (e.g., the normal mode being proper when one quality threshold is exceeded and alternatively when another quality threshold is not yet met), the term 'passing through' the threshold will be used. A time delay may be imposed after the measured value of the signal passes through the threshold value to avoid switching modes frequently due to signal degradations that are only short lived or intermittent (such as passing by a tall concrete building).

Once the value of the measured signal quality passes through the threshold value, a selective switch, preferably located within the block of FIG. 2 that includes the processor 44, de-couples the speaker 56 from the broadcast radio receiver (R1) 60 and couples the media files stored on the internal storage media 50 to the speaker 56. It is stipulated that this is a functional switch, and need not be a physical switch that visually breaks a conductive circuit; enabling and interrupting conduction along a coupling circuit satisfies the coupling/decoupling functions of the switch. The media files, such as stored music files that are compressed with MP-3 or MP-4 or other codecs, are then 'played' by an application software also stored on the internal storage media 50, and converted to an audible signal 38B at the speaker 56. Preferably, the automatic switching based on a comparison to a threshold value as detailed immediately above is supplemented by a manual switching, wherein a user may make an entry at the input block 54 to effect the changeover from normal to virtual radio modes, or vice versa.

Different virtual mode channels preferably appear like the normal mode preset stations to the end user in both normal and virtual modes. For example, when in normal radio mode, the user may change from preset station (frequency band) number 1 to number 2 by depressing a preset button for station 2 or by actuating an up/down selector that scrolls through preset stations, as known in the art for a normal radio. In the present invention, preset station number 3 may switch to virtual radio where stored media files are played. Manually changing from a normal radio preset station to a virtual station preset is effected using the same means as changing between normal radio preset stations (e.g., depressing preset button number 3 or scrolling an up/down preset selector). The display 52 may indicate that virtual radio is active, may indicate one of several virtual radio 'channels' (e.g., 'progressive rock', 'talk radio', etc.) where several groups of media files are separated by content, or both. Switching between normal and virtual radio modes may be only automatic, only manual by the user, or both.

However the virtual radio mode is entered, a series of media files that are stored on the internal storage media 50 is 'played' so that the user may hear them. This aspect is described with reference to FIGS. 3A and 3B. Some of these media files may be semi-permanent 74 such as music media files of popular songs, or disc jockey commentary such as comedy routines, commentator opinion, spoken editorials, and the like. Some of these media files may also be transient or daily media files 76, such as local and national news, weather forecasts, sports reports of the previous day's results, and the like. Personal media files 78 are those that a user may enter into the storage media 50 via the microphone 42, or via an upload from a personal computer or other personal electronic device. A personal media file 78 is distinguishable in that it is not downloaded by a centralized service to numerous portable devices 22; it is sent to a very limited number of specific devices 22. An example includes a personal greeting from one person to another sent via the internet 32 to a particular user and uploaded by that user via a WLAN hotspot 34. Other media files may be advertisements 80.

Also stored on the internal storage media 50 of the portable device 22 is a computer instruction that directs the device 22 as to the order of play for the media files 74, 76, 78, 80. As shown in FIG. 3A, the order of play may include playing one or more media files multiple times in a single rotation. In an embodiment, the semi-permanent files 74 are updated infrequently, no more than once a week and preferably once a month. The daily media files 76, such as weather and news, are preferably updated at least once daily. Personal media files 78 are updated at the user's command, and advertisements are preferably updated infrequently with the semi-permanent files. The computer instruction that directs the order of play may be an explicit instruction that identifies media files in the desired order, or a random order, or an algorithm that is used to generate an order that changes with each day, week, or each time the virtual radio mode is entered. The instruction that directs the order of play may include provisions for various personal media files 78 in the sequence of play, and if not present, the next media file in the sequence is played. In certain embodiments, a DJ commentary media file may be tied to a particular music media file, such as where the DJ commentary explicitly recites the song title or artist. The order of play may ensure these related media files are played sequentially. However, use of the term DJ commentary herein does not restrict those files to be limited to commentary that one would normally hear on a broadcast radio channel while in the normal radio mode.

As the normal radio mode may receive several different broadcast radio channels, there may be a separate computer instruction or playlist directing the order of play for the virtual mode when it the normal mode is tuned to a particular radio channel or one of a group of radio channels. For example, assume a first broadcast radio channel is primarily a country music station and a second broadcast radio station is primarily a pop rock station. When a user enters the virtual mode after being tuned to the first broadcast radio station, a first playlist directs the virtual radio to play the media files as listed in FIG. 3A. When a user enters the virtual radio mode after being tuned to the second broadcast radio station, a second playlist directs the virtual radio to play the media files as listed in FIG. 3B. Many of the media files are on both playlists, such as advertisements, news and weather. At least some of the semi-permanent media files 74 in the first playlist (FIG. 3A) are excluded from the second playlist (FIG. 3B). The MS 22 is enabled to change from one playlist to another by the user selecting another broadcast radio station when the MS 22 is in the virtual radio mode, because the operable playlist is selected based on the user-selected radio channel and the normal or virtual mode is selected either manually or automatically based on broadcast radio signal quality.

A particularly advantageous aspect of the present invention is that the media files, the content that is played while in the virtual radio mode, may be automatically updated on a routine basis. The updates may be to media files, to the order of play, or both. Considering again FIG. 1, an update to the media files may be via a local link 34 to a networked node 36 or via a mobile telephony link 28 that also couples to the internet 32 or other data network. In a preferred embodiment, the device 22 automatically receives updates via a local link 34 such as a Bluetooth connection to a home-based PC or a WiFi or WLAN connection publicly accessible at subway stations or other public places. In this manner, commuters about to enter the subway can receive updates at least to the daily media files 76 at the start of their day, when the content of those files is valid and before the device 22 is likely to first enter the virtual radio mode.

Where the local 34 or mobile telephony link 28 leads to a broader network 32 such as the internet, at least some of the particular media files downloaded to the device 22 may be personalized to a certain extent. A content provider may operate a website by which a user may identify the device 22 such as by telephone number, serial number, or the like, and choose which types of media files he/she is interested in hearing while in the virtual radio mode. For example, one user might select to hear weather and national news and concert information. Another user might select to hear traffic, weather, local news, and sports. Besides genre, users may select a specific host for a genre of media files. For example, one user may select Fox® for national news and a series of commentators for DJ commentary (e.g., George Will on Thursdays, John Ledeen on Tuesdays, etc.). This example presumes a host media provider converts a columnist's current written work to an electronic media file having an audio component. Another user may select a local radio station for weather media files and classic comedy skits (e.g., Bill Cosby, Monty Python) for DJ commentary media files. However selected, when these users connect via the link 34, 28, their updates will be personalized to include media files of the selected genre and/or specific host, and may include other media files such as advertisements 80 and music media files. The relevant media files (e.g., the semi-permanent files updated weekly and the daily media files updated daily) may be updated automatically, such as when the device 22 is first turned on or brought within range of an operational local portal 36 (or PC, as the case may be), or only upon a user command such as the user accessing a content provider website and entering a password. In the event a PC is used as an intermediary between the content provider and the portable device 22, the updated media files may be downloaded from the content provider website and uploaded to the device 22 at different times. While updated media files may also be downloaded via the mobile telephony link 28, this is not the preferred solution as bandwidth on cellular networks is typically less available than that of the preferred downloading methods noted above.

While the above description uses the example of song media files, the present invention is not so limited. Specifically, a developing standard currently known as DVB-H is a compression and transmission protocol developed specifically for digital video broadcast to handheld devices (DVB-H). DVB-H is a terrestrial digital TV standard that uses less power in the receiving portable device (such as the MS 22) than its predecessor standard, DVB-T, from which it is derived. DVB-H also enables the receiving device to move freely while receiving the transmission, thus making it ideal for mobile phones and handheld computers to receive digital TV broadcast over a digital television network, without using mobile telephony networks. Both DVB-T and DVB-H encodes the video signal with MPEG-2, but MPEG-1 is also viable though apparently rarely used. Currently, DVB in general is used in Europe more than in the United States. Any of the media files may have a video component along with the audio component when the MS 22 or other portable device is enabled for DVB. In this manner, the device 22 may switch between normal radio or normal digital television mode to virtual radio or virtual television mode as described above, the essential difference being the latter includes a video component in the media files. It is expected that the DVB-H signals will be distributed via satellite and at least some DVB-H relay stations similar to relay towers used for digital XM Radio® and Sirius® Radio in the U.S. The signals may also be distributed via a network of local portals 36 such as the WiFi hotspots and WLAN gateway portals noted above, though that implementation appears further from realization. Updated media files may then be downloaded to individual devices 22 as above, or may be via the 'normal' DVB-H network using the normal broadcast channel.

The device may be made interactive with a DVB service provider by using the broadcast DVB signal in the downlink direction (to the portable device 22), and using a separate network such as a cellular or PCS network in the uplink direction (from the portable device 22). This arrangement allows the MS 22 to request updated media files on a less robust network and receive those updated media files over the higher volume DVB network. This takes advantage of the inherent asymmetric nature of the data being communicated; relatively little in the request over the crowded mobile telephony link 28, and large volumes of data in the updating response over the high capacity DVB broadcast link 24. More particular details as to communications using the DVB standard may be found at "Digital Video Broadcasting (DVB): Framing structure, channel coding and modulation for digital terrestrial television", EN 300 744, v1.1.2 (1997-08) by the European Telecommunications Standards Institute, herein incorporated by reference. A DVB-H standard is expected soon.

Opportunities for commercialization are enhanced due to the periodic downloads that update the media files. For example, the present invention may be commercialized by charging advertisers based on the position in the sequential order of play in which their advertisement lies. Advertisements sooner in the order are charged more than advertisements later in the sequential order, all other factors such as length of advertisement being equal. The user of the portable device 22 may also be charged a fee for the series of media files that are provided to the device. This may take several forms. The user may be charged a royalty for the copyrighted music or video files that are among the semi-permanent media files 74, and/or the copyright holder (or legal agent) may be charged a fee for the content provider distributing a particular music file, especially if it is found that distribution via the virtual radio invention effectively targets the copyright holder's desired audience.

The user may be charged for the daily media files 76 that are frequently updated via preferably a wireless link, and/or the user may be charged a premium if he/she personalizes the media files to be updated by selecting a preferred group of media files (e.g., genre, source, etc.) as detailed above. The user may be charged a subscription fee so that the charge applies so long as the updated media files are available at promised time intervals (e.g., at least daily updates for daily media files 76, at least weekly updates for semi-permanent media files 74) whether or not he/she actually downloads the updated media files to the device 22. Variable subscription levels and fees may apply, so that a greater number of media files, and/or more frequent updates of them, incur a higher subscription fee than a lesser number and/or lesser update frequency.

Figure 4:
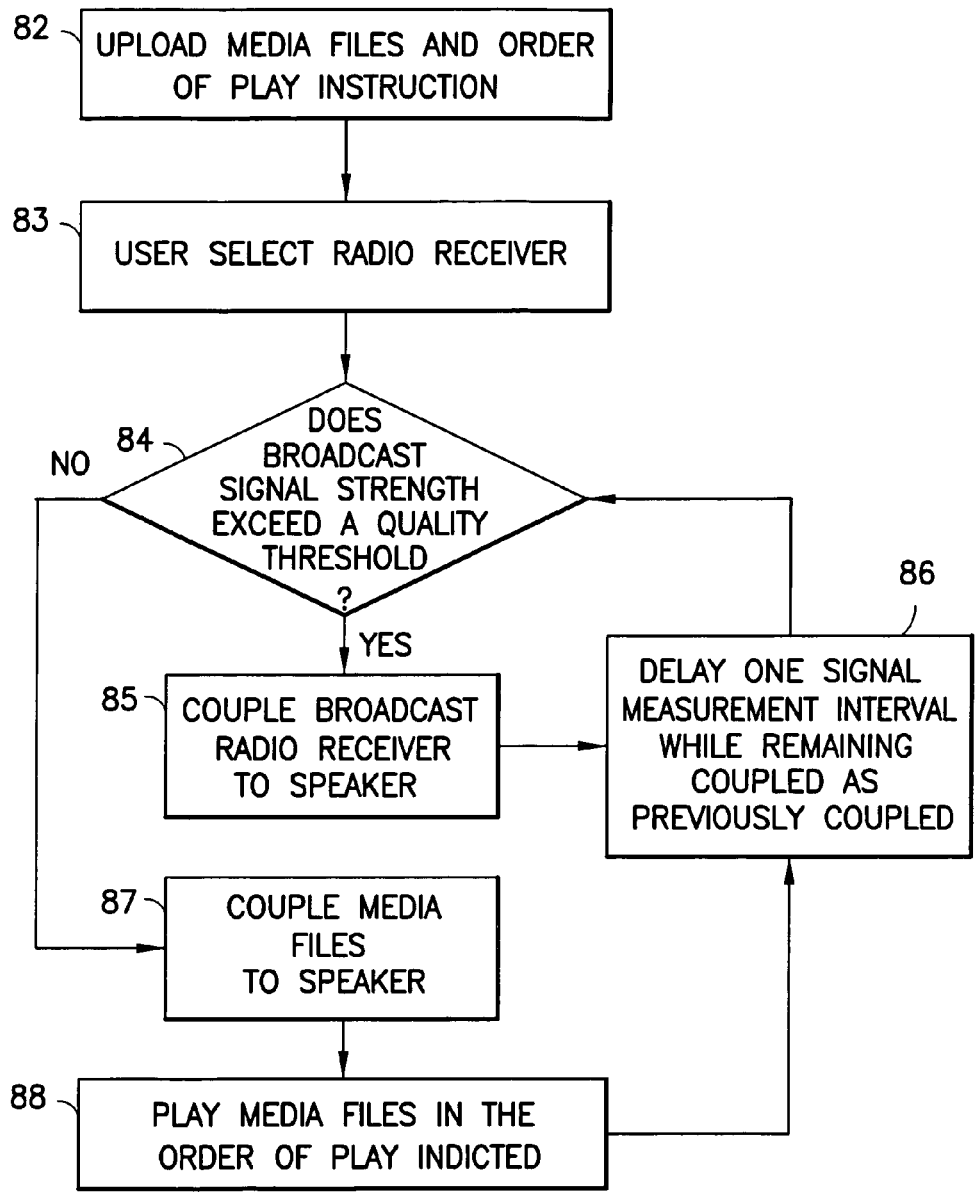
FIG. 4 is a flow diagram depicting operation of a mobile station or other portable device according to the present invention.
Figure 5:
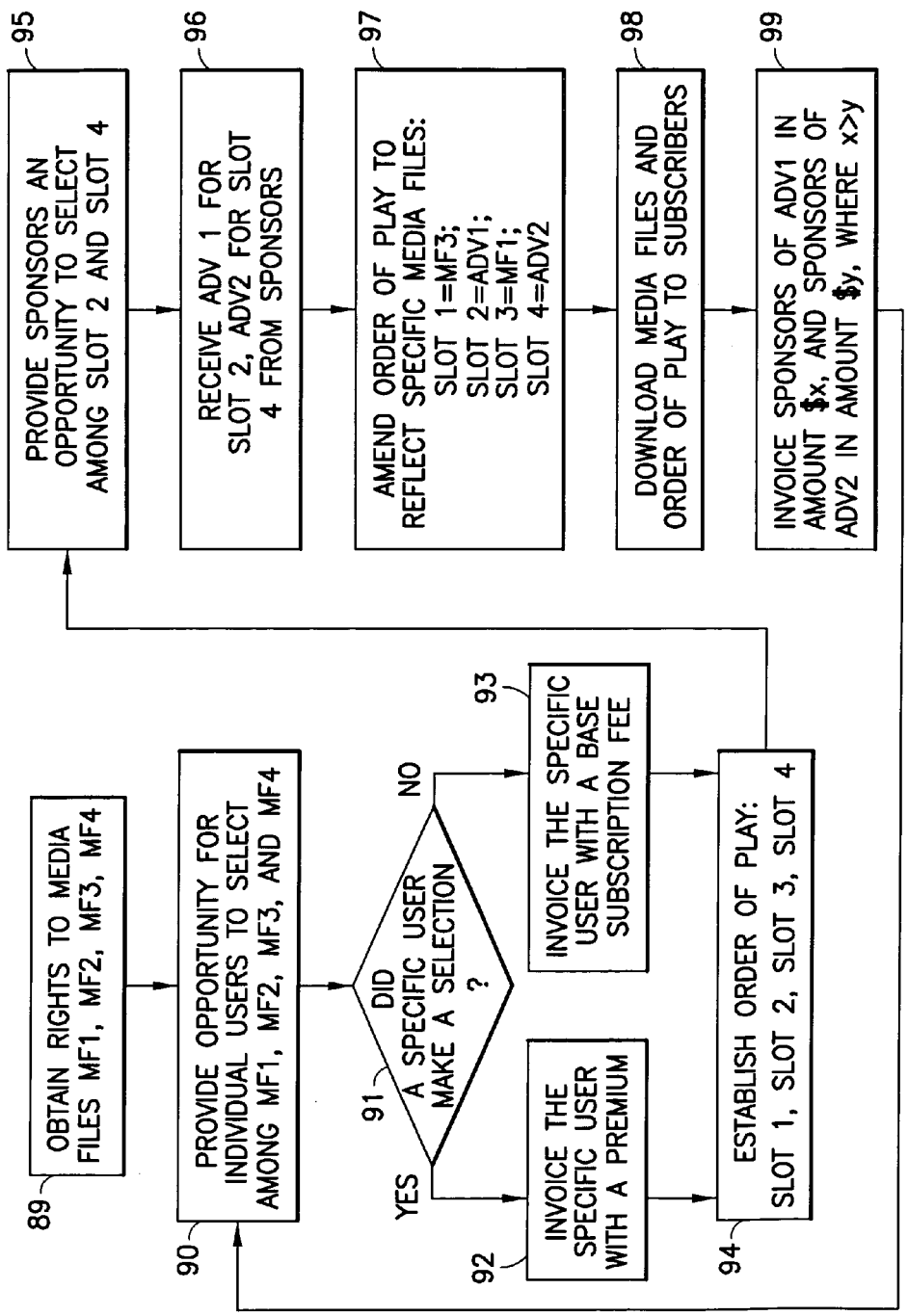
FIG. 5 is a flow diagram showing operation of a business system for commercializing the present invention as a service.

The methods of the present invention are represented in FIGS. 4 and 5. FIG. 4 is a flow diagram that shows operation within the portable electronic device, preferably a mobile station 22 that has both radiotelephone capability and broadcast radio reception capability. At block 82, the mobile station 22 uploads both media files and an instruction as to an order of play for those media files. Initially, these may be uploaded to a mobile station 22 once it is put into the stream of commerce, such as immediately prior to a retail sale of the device 22. Preferably, at least some of the media files and the order of play are updated periodically via a wireless link such as a radiotelephony link 28. At some time, the user selects to listen to the broadcast radio signal 24 via the associated receiver at block 83. The mobile station 22 receives the broadcast radio signal 24 and compares it against a threshold quality parameter at block 84. If the broadcast radio signal 24 is sufficiently strong (or clear or otherwise satisfies the threshold), the broadcast radio receiver 60 is coupled at block 85 to the speaker 56 (which may be a loudspeaker, one or more earpieces, or other such transducer). At prescribed intervals of block 86 in which the speaker 56 remains coupled as before (in this instance, coupled to the broadcast radio receiver), the comparison is again made in block 84 against a measurement of the current broadcast radio signal 24.

Once the broadcast radio signal 24 fails to meet or exceed the threshold in block 84, the media files 74, 76, 78, 80 are coupled in block 87 to the speaker 56 according to the order of play updated in block 82 and played in the currently prescribed order in block 88. During each signal measurement interval such as at block 86, which may or may not be identical to the signal measurement interval used when the speaker is coupled to the broadcast radio receiver, a comparison is again made at block 84 against the current broadcast radio signal 24. The end result is that the user hears, through the speaker 56, the broadcast radio signal 24 only when it is sufficiently strong to provide a clear audible signal, and hears the stored media files in the prescribed order at other times. This is of course contingent on the user selecting appropriately at block 83; an incoming call on the cellular network 28, 30 may modify speaker coupling from that described above, or at least provide a ring tone simultaneous with any other signal being transduced at the speaker.

FIG. 5 depicts how the invention may be commercialized, and all or only some of the depicted and described actions may be included in various embodiments. As an initial matter, the service provider that provides downloaded (or uploaded) copies of media files to users must first obtain rights in them (or alternatively renumerate a statutory licensing fee ex post). This is shown at block 89 for the media files MF1, MF2, MF3, and MF4, which for example, include all media files except advertisements 80. At block 90, the service provider enables individual users, such as subscribers who use the mobile station according to FIG. 4, to select from among a listed series of entertainment media files for which rights are obtained. These may be selections of individual media files, selection by genre or other grouping, and the like. For brevity, block 90 allows a user to select two of four media files. At block 91, it is determined which individual user made a selection. Assume for block 92 that a first user selected MF3 and MF1, in that order of preference. The selecting user is invoiced at block 92 a base subscriber fee for the service, and a premium for his personalized selection. Non-selecting users are invoiced with only a base subscriber fee at block 93.

At block 94, an order of play is established that does not yet assign specific media files to slots in the order. At block 95, sponsors (advertisers) are provided the opportunity to insert their advertisements in certain of the slots in the order of play, slots 2 and 4 made available for them in block 95. At block 96, it is seen that one sponsor selected to put his advertisement 80, ADV1, in slot 2; and another sponsor selected to put his advertisement, ADV2, in slot 4. At block 97, the slots in the order of play are matched to specific media files. Depicted is the order for the user who made the selection at block 91 who was invoiced at block 92: this order of play reflects his media file preferences interspersed with the sponsor's advertisements. At block 98, the media files of block 97 and the order of play that identifies those particular media files is downloaded to the subscribers who selected the media files in block 91/92. Non-selecting users may receive that same set of media files and order of play, or another set of media files but with the same advertisements ADV1 and ADV2 similarly dispersed among the remaining media files. Because each selecting users in block 91 is identifiable by a mobile station identifier that is unique to each and every mobile station 22 and transmitted to the cellular network, downloads may be personalized to many different users making different selections at block 91/92. This assumes the user making the selection is the same user of the mobile station receiving the download. The sponsors of ADV1 and ADV2 are invoiced at block 99 based on their advertisement's relative position within the order of play. Individuals are again provided another opportunity at block 90 to select from among media files, which may be a continuous opportunity while downloads according to block 98 only occur at weekly or monthly intervals. While FIG. 5 and this description presents elements of the method in a logical order, the different elements of the method may be performed in a different order than described, or some elements may be performed simultaneously with other elements.

While described in the context of music media files and a mobile station, the present invention is not limited to only those embodiments as detailed above. While there has been illustrated and described what is at present considered to be a preferred embodiment of the claimed invention, it will be appreciated that numerous modifications are likely to occur to those skilled in the art. It is intended in the appended claims to cover all those modifications that fall within the spirit and scope of the claims.

What is claimed is:

1. An electronic device comprising:
a broadcast radio receiver to receive a broadcast radio signal;
an internal storage to store a plurality of media files and an instruction as to an order of play for the media files, said instruction as to an order of play received over a wireless link and each of said media files comprising an audio component;
audio output means for converting the received broadcast radio signal and the media files to an audible signal;
a switch to decouple the audio output means from the broadcast radio receiver and to couple the audio output means to the plurality of media files, said switch automatically actuated based on a quality of the received broadcast radio signal; and
a processor to play the plurality of media files according to the order of play when the audio output means is coupled to the plurality of media files, wherein said plurality includes at least a first and a second group of media files, and the instruction comprises:

a first instruction as to an order of play for the first group that plays when the broadcast radio receiver is tuned to a first station and when the switch couples the audio output means to the first group of media files; and a second instruction as to an order of play for the second group that plays when the broadcast radio receiver is tuned to a second station and when the switch couples the audio output means to the second group of media files.

2. The electronic device of claim 1 wherein the portable electronic device comprises a mobile telephone.

3. The electronic device of claim 1 further comprising a user interface by which a user may manually actuate the switch.

4. The electronic device of claim 1 wherein the order of play for the media files may not be altered by a user of the device.

5. The electronic device of claim 1 wherein the order of play for the media files may be altered only in part by a user of the device.

6. The electronic device of claim 1 wherein at least one media file of the plurality and within the order of play comprises a disc jockey commentary.

7. The electronic device of claim 1 wherein at least one media file of the plurality and within the order of play comprises an advertisement.

8. The electronic device of claim 1 wherein the electronic device further comprises a microphone and the plurality comprises at least three media files, at least one of which is received at the internal storage via the microphone, and wherein the instruction provides for sequencing each of the at least three media files within the order of play.

9. The electronic device of claim 1 wherein the switch further is to decouple the audio output means from the plurality of media files and to re-couple the audio output means to broadcast radio receiver based on a quality of the received broadcast radio signal.

10. The electronic device of claim 1, wherein the broadcast radio signal is selected from the group AM, FM, and digital FM radio.

11. An electronic device comprising: a broadcast radio receiver to receive a broadcast radio signal; an internal storage to store a plurality of media files and an instruction as to an order of play for the media files, each of said media files comprising an audio component, said instruction as to an order of play received over a wireless link and not normally alterable by a user of the device; audio output means for converting the received radio signal and the media files to an audible signal; a switch to selectively couple the audio output means at any instant to only one of the broadcast radio receiver and the plurality of media files; and a processor to play the plurality of media files according to the order of play when the audio output means is coupled to the plurality of media files, wherein said plurality includes at least a first and a second group of media files, and the instruction comprises: a first instruction as to an order of play for the first group that plays when the broadcast radio receiver is tuned to a first station and when the switch couples the audio output means to the first group of media files; and a second instruction as to an order of play for the second group that plays when the broadcast radio receiver is tuned to a second station and when the switch couples the audio output means to the second group of media files.

12. The electronic device of claim 11 wherein the broadcast radio signal is selected from the group AM, FM, and digital FM radio.

13. A method of playing media files in an electronic device comprising: wirelessly receiving at an electronic device an instruction directing an order of play for media files; storing, on an internal storage media of the electronic device, a plurality of media files and the instruction directing an order of play for the plurality of media files; receiving a broadcast radio signal at the electronic device; coupling said broadcast radio signal to an audio output means of the electronic device; automatically upon a quality of the received broadcast radio signal passing through a threshold quality parameter, coupling the plurality of media files to the audio output means and playing the plurality of media files in the order of play directed by the instruction, wherein said plurality includes at least a first and a second group of media files, and the instruction comprises: a first instruction as to an order of play for the first group that plays when the broadcast radio receiver is tuned to a first station and when the switch couples the audio output means to the first group of media files; and a second instruction as to an order of play for the second group that plays when the broadcast radio receiver is tuned to a second station and when the switch couples the audio output means to the second group of media files.

14. The method of claim 13 wherein the plurality of media files comprise first-stored media files, the method further comprises:

receiving and storing at least one updated media file at the internal storage; and sequencing the at least one updated media file in the order of play.

15. The method of claim 14 wherein receiving and storing at least one updated media file comprises downloading the at least one updated media file via a wireless link.

16. The method of claim 14 wherein receiving and storing at least one updated media file comprises receiving the at least one updated media file via a microphone of the portable electronic device.

17. An electronic device comprising: first receiving means for wirelessly receiving an instruction as to an order of play for media files; second receiving means for receiving a broadcast radio signal; storage means for locally storing a plurality of media files each comprising an audio component, and for locally storing the instruction as to an order of play; audio output means for converting the broadcast radio signal and the audio component of the media files to sound; switching means for de-coupling the audio output means from the receiving means and for coupling the audio output means to the storage means automatically in response to a measured signal quality of the broadcast radio signal; and processing means for sequencing the stored plurality of media files to the audio output means according to the instruction as to an order of play, wherein said plurality includes at least a first and a second group of media files, and the instruction comprises: a first instruction as to an order of play for the first group that plays when the broadcast radio receiver is tuned to a first station and when the switch couples the audio output means to the first group of media files; and a second instruction as to an order of play for the second group that plays when the broadcast radio receiver is tuned to a second station and when the switch couples the audio output means to the second group of media files.

18. The device of claim 17, wherein:

the first receiving means comprises one of a mobile telephony receiver, wireless local area network receiver, and piconet receiver;

the second receiving means comprises one of an AM and an FM radio receiver;

the storage means comprises a computer readable storage media;

the audio output means comprises a speaker;

the switching means comprises an electronic switch actuated by a computer program executed by a processor, the computer program embodied on a computer readable storage medium; and the processing means comprises a digital processor.

19. A program of machine-readable instructions, tangibly embodied on an information bearing medium and executable by a digital data processor, to perform actions directed toward selectively coupling audio output means to different input sources, the actions comprising:

locally storing an order of play, received over a wireless link, for a plurality of locally stored media files;

monitoring a quality of a broadcast radio signal at an electronic device;

responsive to the monitored quality passing through a threshold quality in a first direction, automatically de-coupling the broadcast radio signal from an audio output means of the device and coupling a plurality of locally stored media files to the audio output means and playing the at least two of the plurality of locally stored media files through the audio output means according to the stored order of play, wherein said plurality includes at least a first and a second group of media files, and the stored order of play comprises:

a first order of play for the first group that plays when the broadcast radio receiver is tuned to a first station and when the switch couples the audio output means to the first group of media files; and a second order of play for the second group that plays when the broadcast radio receiver is tuned to a second station and when the switch couples the audio output means to the second group of media files.

20. The program of claim 19, further comprising:

responsive to the monitored quality passing through a threshold quality in a second direction opposite the first, automatically de-coupling the plurality of locally stored media files from the audio output means of the device and coupling the broadcast radio signal to the audio output means.

* * * * *